Patented Mar. 24, 1925.

1,530,594

UNITED STATES PATENT OFFICE.

ERNEST J. COLLINGS, OF BRIDGEPORT, CONNECTICUT, AND ARGIMIRO MORALES, OF NEW YORK, N. Y., ASSIGNORS TO NEW JERSEY SUGAR PRODUCTS CORPORATION, OF MATAWAN, NEW JERSEY, A CORPORATION OF NEW JERSEY.

RECOVERY OF SIRUP FROM WASTE-SUGAR PRODUCTS.

No Drawing. Application filed April 14, 1921. Serial No. 461,431.

*To all whom it may concern:*

Be it known that we, ERNEST J. COLLINGS, of Bridgeport, county of Fairfield, and State of Connecticut, and ARGIMIRO MORALES, of the borough of Manhattan, county and State of New York, both citizens of the United States, have invented certain new and useful Improvements in the Recovery of Sirup from Waste-Sugar Products, of which the following is a specification.

The invention relates to the recovery of sirup from waste sugar products such as scrap candy or stale candy. There are large quantities of scrap candy in storage at various manufacturing establishments throughout the country, which are not available for use in the manufacture of new candy or for the production of sirup or other sugar products for edible use, because of various impurities and ingredients therein which deleteriously affect the new products made therefrom. We have found that hard candies generally contain sugar, glucose, flavoring material, coloring material, cream of tartar, and a certain percentage of an acid, usually tartaric or citric. In scrap or stale candy there is usually, also, contained a certain amount of impurity in the form of oil or grease and starch, which substances have usually gotten into the candy from the pans or tables on which the same was originally made. The cheaper kinds of candies often additionally contain starch or jelly as a filler.

Certain forms of hard candy contain large quantities of starch, and paste candy usually contains considerable amounts of jelly or gelatine, in addition to comparatively large percentages of starch. These candies, as well as jelly and gelatine candies, usually also contain the various other ingredients referred to in the description of hard candy.

The invention comprises a process for producing a purified sirup or reclaiming and refining sugar and glucose from such material as those described above. The invention is based on a realization of the several problems involved in purifying such material to render the same available for the purposes referred to. Generally speaking, it has been found necessary to eliminate the acid contained in the scrap or waste product, to so treat the material that the starch contained therein will be rendered harmless, to remove the flavoring and coloring material, and also to get rid of the oily or greasy material which may be contained in the mass. In practicing the various steps of the process and eliminating the various harmful constituents of the scrap material, care must be taken to prevent the material from being injured by various factors, since a too acid condition or an alkaline condition, or the use of too great heat may spoil the product.

The objects of the invention, generally speaking, are the provision of an effective and readily controlled process for the purpose described, the invention also comprising various process steps some of which may be performed without the others, with the production of a product which will have some, at least, of the advantages of the product which is produced by the complete process.

In practicing the invention, we have found that the elimination of the acid and the treatment by which the starch is rendered harmless, are probably the most important factors in the success of the process. In regard to the acid, it has been found that the most successful treatment comprises, first, forming a suitable solution of the scrap candy and then acting upon the same with an alkaline agent so calculated as to precipitate an insoluble salt of the acid, and at the same time to leave the solution slightly acid. The alkaline agent which is best adapted for the purpose seems to be a salt of an alkaline earth metal, or, more specifically, calcium carbonate or marble dust.

The flavoring matter and coloring material may be removed, at least to a considerable extent, by steaming off the solution or otherwise treating the same to volatilize the flavoring and coloring materials, since these substances are vegetable compounds, essential oils or alcohols which may be volatilized with steam. The coloring matter which remains in the solution may be removed by treatment with a decolorizing agent such as animal charcoal. A certain amount of the oily material present may be skimmed from the top of the solution when the latter is first formed. Oily material which is not thus removed may be eliminated by treating the solution with an infusorial earth which will absorb the oil, a coagulating agent preferably being added to coagulate the suspended matter so that the same may readily be removed by a filtering operation. The starch when present may be converted into maltose which may be left in the solution without harmful effect.

Having now briefly described the various most important steps of the process, the same will be set forth in greater detail. Considering hard candy more particularly, this material is most effectively treated in one of two ways, according to whether the starch content of the same is comparatively small or large.

Considering first the scrap candy containing a small amount of starch, such as an amount of starch no greater than 5% of the product, the material is preferably dissolved in an open kettle at a temperature which is preferably in the neighborhood of 70° C., and which must not in any case be sufficiently high to burn any of the ingredients of the material. Also, if the heat is too high, the sugar in the material may be converted into the invert state, which is to be avoided.

The solution should be stirred vigorously while it is being heated, and is preferably brought to a consistency of from 20° to 30° Bé., preferably by injecting live steam into the material. A certain amount of scum rises to the top of the solution and should be skimmed off, this scum comprising oily impurities.

The solution is now treated with a sufficient amount of a suitable alkaline agent, preferably marble dust (calcium carbonate) to precipitate the tartaric or citric acid, and the tartaric acid which is contained in the cream of tartar in the mass. It is also important that the solution should remain slightly acid after this operation. As an example, it may be said that 5 c. c. of the solution may take 0.5 c. c. of N/10 sodium hydroxide solution, this being in the case of a solution which contained 3% of tartaric acid. Calcium carbonate is an insoluble salt, and because of impurities which it always contains, is it faintly alkaline. The treatment described must, therefore, be done very carefully and under chemical control. The calcium carbonate should be mixed with water and added slowly to the solution while the latter is being stirred continuously. If the solution should become alkaline, it should be acidified immediately, preferably with phosphoric acid or some acid phosphate salt.

It should be noted that if the solution is alkaline it will turn dark in color because of the decomposition of glucose contained in the solution, and this color will increase in intensity with temperature and time. On the other hand, if the solution is too acid, the sugar contained therein may be converted into the invert state. It may also be noted that the treatment of the solution with malt mash liquor for the conversion of the starch into maltose to be hereinafter described, cannot be effectively carried out if the solution is alkaline.

As has been stated above, any fats and greases that came to the top of the solution when the latter was first heated were skimmed off. To remove fats and greases which may form in the solution it is advisable to add a sufficient amount of an infusorial earth, preferably kieselguhr, to absorb the small amount of oil present. A small amount of a coagulating material such as alum is preferably added for purposes of coagulating the suspended matter so as to enable the same to be filtered out. The flavoring matter and coloring material may be largely removed by volatilizing the same. This may be accomplished by again injecting live steam into the solution for about half an hour, the solution being brought almost to the boiling point, or say to a temperature of about 82° C. The flavoring matter and coloring material used in the making of candies are vegetable products, belonging to the group of essential oils or alcohols and are readily volatilized with steam. Accordingly the greater part of these substances will be eliminated in this manner.

Some of the coloring matter in the solution usually remains after this treatment, and accordingly it is advisable to decolorize the solution by treating the same with a decolorizing compound, preferably animal charcoal. This may be ground up in powdered form and mixed in the solution, a suitable proportion being one pound of charcoal to about two hundred pounds of the scrap candy.

After the various steps referred to have been accomplished, the solution is filtered, preferably by passing the same through a filter press, after which the clear filtered sirup may be placed in a vacuum pan or evaporator and evaporated down to a suitable consistency for use, such as 36° Bé. The precipitated salt of the acid and the coagulated infusorial earth and oil will, of course, be filtered out.

If the candy is one in which the starch content is high, as stated above, the above process is preferably modified by dissolving the candy in an autoclave in which the solution is boiled vigorously under a pressure which may be one of about fifty pounds, until the starch granules are broken up. This treatment may continue, for example, for about one hour, the solution being boiled at a temperature which may be about 120° C. The solution is then cooled down to a suitable temperature which may be, for example, about 65° C. to 70° C. It is then treated with diastatic liquor of a malt mash until all of the starch is hydrolyzed and converted into maltrose. The malt mash liquor may be suitably used in the proportion of about 2% of the weight of the starch. The process may then be continued in the manner previously described, that is, the solution may be treated with calcium carbonate and infusorial earth and alum, charcoal added and the temperature raised to a suitable point for volatilizing the flavoring, and coloring materials.

If the starch is a light boiling starch, the use of the autoclave may not be necessary. In this case the sirup may be treated in an open pan or kettle, the treatment being the same as that just described, except that no pressure is used during the boiling of the sirup preparatory to adding the malt liquor.

In the form of the process first described, in which the solution was treated in an open kettle, treatment of the solution with diastatic liquor of a malt mash may be made use of if necessary. In this case the solution may be boiled at a temperature of say about 120° C., until the starch granules are broken up, after which, if the small amount of starch in the material is sufficient to render the treatment with the malt mash liquor desirable, this malt mash material in the proportion of about 2% of the starch may be added to the solution at a suitable point in the process, such as immediately after the addition of the calcium carbonate. If however, the starch in the candy is a hard boiling starch, it may be necessary to treat the solution in an autoclave so that the starch granules may be broken up under heat and pressure, and transformed into a condition in which the malt will readily attack the same. In most cases when the starch content of the material is under say five per cent, the special treatment described above will not be necessary.

The reason for converting the starch into maltose is, that the presence of any considerable amount of starch in the sirup causes the latter, upon concentration in the vacuum pan, to become cloudy and opaque. In such a case also it was found that the solution does not filter readily, necessitating frequent washing of the filter cloths. This difficulty was found to be due to the water soluble starch present.

One further class of candy remains to be considered, namely, candies which contain a considerable amount of jelly or gelatine. In such a case the process first described is varied by heating the material up to the boiling point as the first step, instead of merely heating it up to about 70° C. as was described in the first form of the process referred to above. A material for coagulating the gelatine, preferably tannic acid, is added to the boiling solution after which the solution is filtered and the coagulated gelatine removed. The process may then be carried out from this point in the manner already described.

It will be understood that the invention is not limited strictly to the various details which have been particularly described above, but that the same should be understood as having a considerable breadth, as is indicated by the accompanying claims.

What we claim is:

1. A process for producing a purified sirup from scrap or stale candy, which comprises, dissolving the material, neutralizing acid therein, in such manner as to leave the solution slightly acid, converting starch in the material into maltose, and filtering the product.

2. In a process for producing a purified sirup from scrap or stale candy, containing starch, the steps which comprise dissolving the material, treating the solution with an alkaline agent calculated to precipitate flavoring acid contained therein as an insoluble salt, and to leave the solution slightly acid, and filtering the product.

3. In a process for producing a purified sirup from scrap or stale candy, the steps which consist in heating the material to break up granules of starch therein, and treating the hot solution with malt to convert the starch to maltose.

In testimony whereof, we have signed our names to this specification.

ERNEST J. COLLINGS.
ARGIMIRO MORALES.